(12) United States Patent
Laube et al.

(10) Patent No.: US 10,823,021 B2
(45) Date of Patent: Nov. 3, 2020

(54) AERODYNAMICALLY ACTING FINAL SILENCER FOR A MOTOR VEHICLE

(71) Applicant: Dr. Ing. h.c. F. Porsche Aktiengesellschaft, Stuttgart (DE)

(72) Inventors: Thomas Laube, Leonberg (DE); Frank Repphun, Ostelsheim (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 274 days.

(21) Appl. No.: 15/806,583

(22) Filed: Nov. 8, 2017

(65) Prior Publication Data
US 2018/0142589 A1 May 24, 2018

(30) Foreign Application Priority Data
Nov. 21, 2016 (DE) .......................... 10 2016 122 287

(51) Int. Cl.
*F01N 1/16* (2006.01)
*B62D 35/02* (2006.01)

(52) U.S. Cl.
CPC ............... *F01N 1/16* (2013.01); *B62D 35/02* (2013.01); *Y02T 10/82* (2013.01); *Y02T 10/88* (2013.01)

(58) Field of Classification Search
CPC . F01N 1/16; Y02T 10/82; Y02T 10/88; B62D 35/02
USPC ................................................. 181/228, 282
See application file for complete search history.

(56) References Cited

U.S. PATENT DOCUMENTS

| | | | | |
|---|---|---|---|---|
| 4,772,062 A | * | 9/1988 | Janssen | B62D 35/007 296/180.5 |
| 5,371,331 A | * | 12/1994 | Wall | F01N 1/24 181/227 |
| 6,220,387 B1 | * | 4/2001 | Hoppes | F01N 1/14 181/227 |
| 9,102,368 B2 | * | 8/2015 | Kimura | B62D 35/02 |
| 9,932,074 B2 | * | 4/2018 | Sarhadiangardabad | B62D 35/02 |
| 9,937,963 B2 | * | 4/2018 | Sandgren | B62D 35/001 |
| 10,315,579 B2 | * | 6/2019 | Gaylard | B60R 3/02 |
| 10,384,730 B2 | * | 8/2019 | Klop | B62D 35/005 |
| 10,450,011 B2 | * | 10/2019 | Harter | F16D 65/847 |
| 2006/0065480 A1 | * | 3/2006 | Leehaug | F01N 13/14 181/283 |

(Continued)

FOREIGN PATENT DOCUMENTS

DE 34 09 667 9/1985
DE 10 2008 039 495 2/2010

(Continued)

*Primary Examiner* — Forrest M Phillips
(74) *Attorney, Agent, or Firm* — Gerald E. Hespos; Michael J. Porco; Matthew T. Hespos

(57) ABSTRACT

An air guiding arrangement is integrated into a rear underbody of a motor vehicle that is driven by an internal combustion engine. The air guiding arrangement includes a final silencer (1) in an exhaust system (3.1, 3.2, 3.3, 3.4, 4.1, 4.2). The final silencer (1) has an underside that faces an underlying surface on which the vehicle is supported. The underside of the final silencer (1) is shaped in an aerodynamic fashion with at least one duct (6) that runs essentially in the direction of travel (X). The duct (6) has an inverted U shape or inverted V-shape that is open in the underside of final silencer (1). Air deflector elements (7, 8, 9) may partly cover the air duct (6) for guiding the air flow.

12 Claims, 2 Drawing Sheets

(56) References Cited

U.S. PATENT DOCUMENTS

| | | | | |
|---|---|---|---|---|
| 2013/0059519 A1* | 3/2013 | Tajima | ................... | B60K 11/04 |
| | | | | 454/152 |
| 2013/0068554 A1* | 3/2013 | Hayama | ................. | F01N 13/14 |
| | | | | 181/228 |
| 2014/0151149 A1* | 6/2014 | Ross | ................... | F01N 13/1888 |
| | | | | 181/282 |
| 2015/0008698 A1* | 1/2015 | Reisenhofer | ........... | B62D 25/20 |
| | | | | 296/180.1 |
| 2015/0053499 A1* | 2/2015 | Won | ......................... | F01N 1/14 |
| | | | | 181/228 |
| 2019/0283812 A1* | 9/2019 | Grandominico | ..... | B62D 35/001 |

FOREIGN PATENT DOCUMENTS

| | | |
|---|---|---|
| DE | 10 2012 006 818 | 10/2013 |
| EP | 0 257 341 | 1/1990 |
| JP | 2002-347664 | 12/2002 |

\* cited by examiner

AERODYNAMICALLY ACTING FINAL SILENCER FOR A MOTOR VEHICLE

CROSS REFERENCE TO RELATED APPLICATION

This application claims priority under 35 USC 119 to German Patent Appl. No. 10 2016 122 287.9 filed on Nov. 21, 2016, the entire disclosure of which is incorporated herein by reference.

BACKGROUND

Field of the Invention

The invention relates to a final silencer that is integrated into an exhaust system and disposed at the rear underbody of a motor vehicle driven by an internal combustion engine.

Description of the Related Art

The silencer of an exhaust system in motor a vehicle that is driven by internal combustion engines is arranged in the vehicle underbody and integrated so that the air flow in this region is not affected adversely, or is affected adversely only to a small degree. Some such silencers are relatively voluminous due to the tasks to be performed, and usually are divided into plural chambers. Modern vehicles often configure the vehicle underbody aerodynamically or arrange aerodynamically effective air deflector elements in the underbody region with the objective of generating as little lift as possible. In contrast to spoilers arranged un the upper side of the vehicle, appropriately configured air deflector elements in the region of the vehicle underbody can achieve downthrust that is virtually neutral in terms of air resistance.

The prior art discloses silencers with components used for flow guidance in the underbody region of a motor vehicle.

DE 10 2008 039 495 A1 describes an underbody of a motor vehicle with depressions or elevated portions that are intended to channel the air flow in the underbody region over the longitudinal extent of these elements and in the direction of travel. Additionally, such longitudinally running flow elements also are disposed in the region of a final silencer.

DE 34 09 667 A1 discloses the rear part of a motor vehicle having a largely planar underbody that rises somewhat toward the rear from the center of the vehicle in a diffuser-like fashion. The exhaust system has a silencer that is arranged in an aerodynamically favorable fashion within a longitudinal tunnel in the underbody and that is configured in the manner of a diffuser.

EP 0 257 341 B1 shows a silencer arranged in the rear region of a motor vehicle. The rear silencer is formed overall in an aerodynamic fashion as a spoiler element in the rear region and at a distance from the underbody of the motor vehicle.

JP 2002 347 664 A describes a final silencer that is positioned in a concave cavity in a motor vehicle underbody and is intended to form an essentially planar underbody with the regions that surround the final silencer.

DE 10 2012 006 818 B4 discloses a silencer of an exhaust system with an aerodynamically effective underside. The front part of the silencer in the direction of travel is intended to merge in a planar fashion with a rear part that curves up. Overall, the silencer is to generate an aerodynamic effect through a particular configuration.

An object of the invention is to achieve an improved aerodynamic effect through the configuration of the final silencer with an arrangement of a final silencer in the underbody of a motor vehicle that is as economical as possible in terms of space.

SUMMARY

The invention relates to a final silencer in a motor vehicle on whose underbody air deflector elements are arranged. The air deflector element communicates with at least one duct formed at the underside of the final silencer of an exhaust system. The duct runs essentially in the direction of travel and is shaped essentially in a U shape or V shape.

The air deflector element is arranged at a distance from the underbody of the vehicle or from the duct formed in the exhaust silencer is configured in an approximately T shape. The T shape includes a T transverse web that is in front of the final silencer in the direction of travel and that extends essentially over the entire underbody width of the vehicle. The T shape also has a T longitudinal web that extends into or at least partly covers the duct formed in the final silencer. The T longitudinal web also may extend, if appropriate, beyond the longitudinal extent of the duct.

A structurally simple implementation of the inventive solution is considered to be that the duct is arranged centrally in the final silencer and is bounded laterally by two housing parts of the final silencer with aerodynamically shaped floor regions that essentially face the upper side of the underlying ground or pavement surface.

A centrally arranged duct may be provided in the final silencer along with two or more ducts that run essentially in parallel and are arranged with air deflector elements integrated in them.

The air deflector elements may be arranged in a variable fashion in respect of their distance or their position with respect to the motor vehicle underbody. In particular, the T longitudinal web that runs in the region of the duct or the ducts in the final silencer may be individually adjustable. The adjustment capability can be implemented automatically as a function of the velocity of travel or else optionally by the driver.

The arrangement of the air deflector element or elements in the region of the final silencer may be selected so that despite the possible movements of the final silencer due to aggregate movement or thermal expansion, the arrangement takes place free of collisions and remains effective. In addition, the materials for the deflector elements and, if appropriate, the materials and the arrangement of the adjustment mechanisms are to be selected in such a way that despite high ambient temperatures in the vicinity of the final silencer its function is not impaired. This can be achieved by heat shielding and by corresponding convective cooling from the underbody.

Advantages, features and details of the arrangement and configuration of a final silencer in an exhaust system of a motor vehicle arise from the following description of an exemplary embodiment and on the basis of the schematic illustrations thereof. The described features and combinations of features as shown below in the figures and the features and combinations of features described with reference to the drawing can be applied in the specified combination and also in other combinations or alone without departing from the scope of the invention

DETAILED DESCRIPTION

Figure 1:
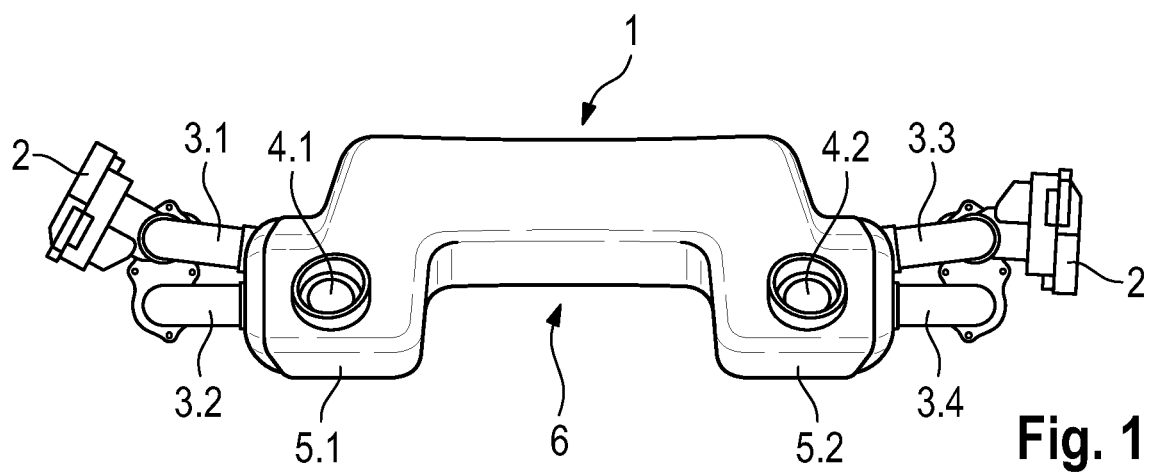
FIG. 1 is an elevation view of a final silencer according to the invention as seen from the rear of a vehicle.

A final silencer in accordance with an embodiment of the invention is identified by the numeral 1 in FIG. 1. The final silencer 1 is divided in its interior into chambers connected by pipes in a manner that currently is known. The schematic illustration shows a view from the rear in the direction of travel of the arrangement of the final silencer 1 behind or approximately in the region of the wheel suspension units 2 of a motor vehicle. The inlet pipes of an exhaust system into which the final silencer 1 is integrated are denoted by 3.1 to 3.4. The exhaust gas outlet openings from the final silencer 1 are denoted by 4.1 and 4.2, respectively.

The final silencer 1 is arranged with its upper region and its forward-directed sidewalls integrated into the underbody of the motor vehicle. The faces 5.1 and 5.2 of the final silencer housing are arranged opposite the underlying surface and arc mostly smooth to guide the flow in the underregion of the vehicle, but the faces 5.1, 5.2 may have grooves arranged longitudinally in the direction of travel and may rise as the faces 5.1, 5.2 run toward the rear.

Figure 2:
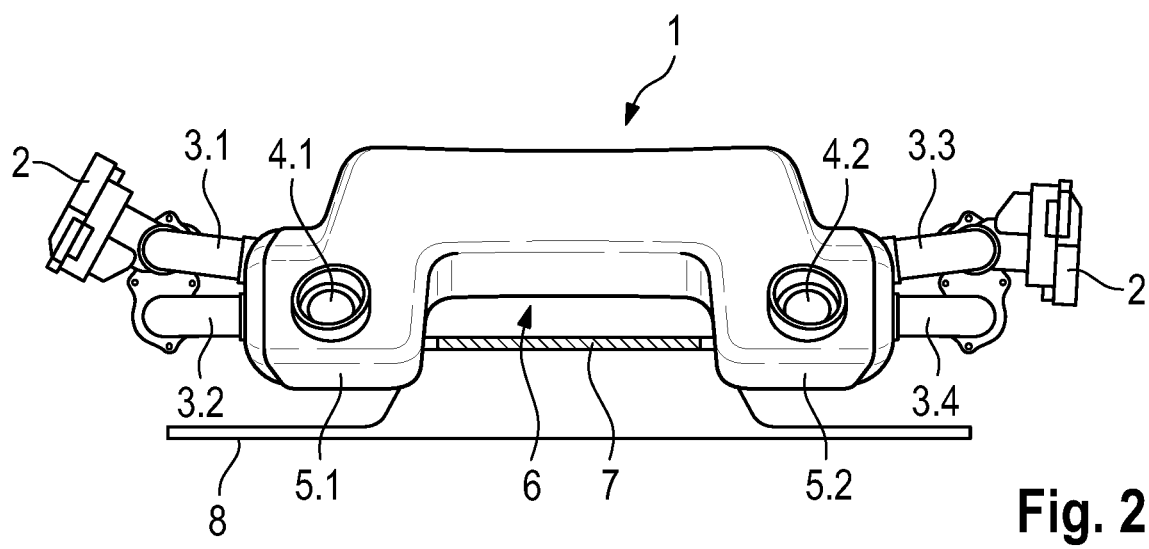
FIG. 2 is a rear view of the final silencer of FIG. 1 with an integrated air deflector element shown in section in the central region of the final silencer.

An essentially U-shaped duct 6 is formed in the central region of the final silencer 1 in the embodiment of FIGS. 1 and 2. The duct 6 can also be narrower or wider and need not have a U shape, but instead can be have a trapezoidal shape with lateral oblique faces or with side faces that run to a point in approximately a V shape. An air deflector element 7 is integrated at a distance from the final silencer housing 1, in the duct 6 and has an essentially planar and smooth face that faces the final silencer housing 1.

Figure 3:
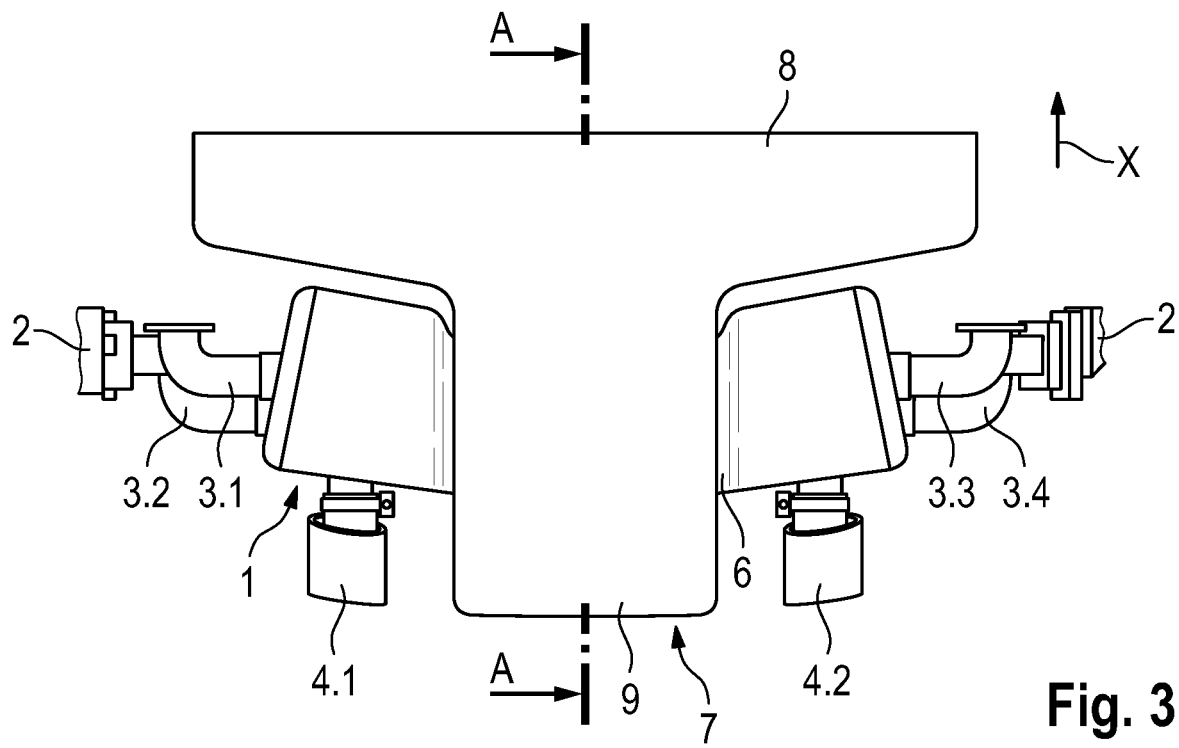
FIG. 3 is a bottom view of the final silencer of FIGS. 1 and 2 with an air deflector element.

As shown in FIG. 3, the air deflector element 7 has an essentially T shape. In this context, the t-shaped air deflector element 7 has a transverse web 8 in front of the final silencer 1 with respect to the forward direction of travel. Additionally, the transverse web 8 at the front region facing the direction of travel extends essentially over the entire underbody width of the vehicle and at a distance from the underbody. Thus, a flow duct is formed between the air deflector element 7 or the T transverse web 8 and the underbody of the vehicle. The T-shaped transverse web 8 of the air deflector element 7 merges in a tapering fashion with a T longitudinal web 9 in the region of both the final silencer 1 and the duct 6 and is spaced from the housing of the final silencer 1 to define a flow-guiding means. Additionally, the T longitudinal web 9 projects, where appropriate, beyond the web 6 of the final silencer 1.

The arrow X (see top right of FIG. 3) indicates the direction of travel for the sake of clarification.

Figure 4:
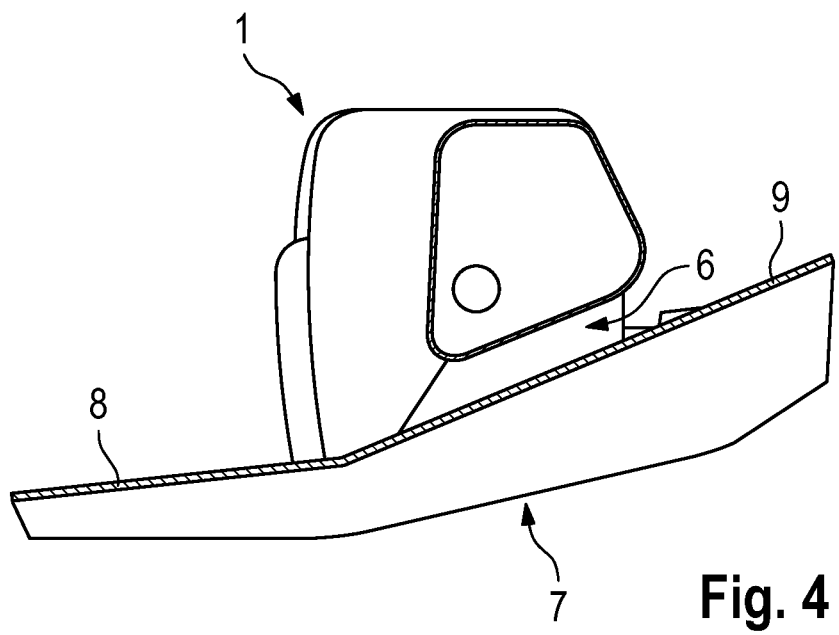
FIG. 4 shows a section (sectional line A-A in FIG. 3) through the final silencer and air deflector element according to the invention.

FIG. 4 is a cross-section taken along line A-A in FIG. 3 through the final silencer 1 centrally in the duct 6 with the air deflector element 7 and the T transverse web 8 and T longitudinal web 9 thereof.

If appropriate, the air deflector element 7 is arranged in such a way that its distance and its positioning with respect to the vehicle underbody and the duct 6 in the exhaust silencer 1 can be varied and, if appropriate, adjusted individually (manually or automatically). It is also conceivable for the air deflector element 7 to be constructed from plural elements, e.g. from a T transverse web 8 and a separate T longitudinal web 9 that is arranged movably on the T transverse web 8 and can be adjustable automatically or manually with respect to the distance and angular position in relation to the face of the duct 6 that is assigned to the T longitudinal web 9.

LIST OF REFERENCE NUMERALS

1 Final silencer
2 Wheel suspension unit
3.1-3.4 Pipes of the exhaust system
4.1, 4.2 Exhaust gas outlet opening
5.1, 5.2 Faces on 1
6 Duct
7 Air deflector element
8 T transverse web on 7
9 T longitudinal web on 7

What is claimed is:

1. An air guiding arrangement at a rear underbody of a motor vehicle that is driven by an internal combustion engine, the air guiding arrangement comprising: a final silencer defining part of an exhaust system, the final silencer having a housing with a central region and two laterally spaced housing parts at opposite respective lateral sides of the central region of the housing, the laterally spaced housing parts projecting farther down from an underside of the rear underbody of the motor vehicle than the central region of the housing so that housing of the final silencer is configured to form at least one downwardly open duct that runs essentially in a direction of travel at a position below the central region of the housing and between the laterally spaced housing parts, the duct being configured to define an inverted U shape or an inverted V shape; and at least one air deflector element below the central region of the housing and at least partly covering the at least one duct and providing communication with the at least one duct guiding an air flow.

2. The air guiding arrangement of claim 1, wherein the at least one air deflector element is arranged at a distance from the underbody of the vehicle or from the duct, the at least one air deflector element is configured in an approximately T shape with a T transverse web and a T longitudinal web, the T transverse web being arranged in front of the final silencer in the direction of travel and essentially extending over an entire underbody width of the vehicle, and the T longitudinal web extending into or across the duct formed in the final silencer at a position spaced below the central region of the housing, extending between the laterally spaced housing parts and extending beyond a longitudinal extent of said duct.

3. The air guiding arrangement of claim 1, wherein the duct is arranged centrally in the final silencer.

4. The air guiding arrangement of claim 1, wherein the duct rises toward a rear region of the vehicle.

5. The air guiding arrangement of claim 1, wherein a distance and location of the air deflector element with respect to the duct and/or the underbody of the motor vehicle is adjustable for influencing the flow.

6. The air guiding arrangement of claim 5, adjustment of the location and position of the air deflector element can be implemented automatically or manually.

7. The air guiding arrangement of claim 1, wherein the final silencer includes two exhaust gas outlet openings extending respectively from the two laterally spaced housing parts.

8. The air guiding arrangement of claim 1, wherein the final silencer includes at least two pipes of the exhaust system extending into laterally spaced positions on a front side of the housing.

9. The air guiding arrangement of claim 1, wherein the air deflector element rises toward a rear region of the vehicle.

10. The air guiding arrangement of claim 9, wherein a lower surface of the central region of the housing rises toward the rear region of the vehicle.

11. The air guiding arrangement of claim 10, wherein the lower surface of the central region of the housing is substantially parallel to an area of the air deflector element position below the lower surface of the central region of the housing.

12. The air guiding arrangement of claim 2, wherein opposite lateral ends of the T transverse web extend substantially to left and right rear wheel suspension units of the motor vehicle.

\* \* \* \* \*